United States Patent
Braun

(10) Patent No.: US 8,318,311 B2
(45) Date of Patent: Nov. 27, 2012

(54) BONDING AGENT COMPOSITION FOR POLYMER SUBSTRATES

(75) Inventor: Andreas Braun, Wolfhalden (CH)

(73) Assignee: Sika Technology AG, Baar (CH)

( * ) Notice: Subject to any disclaimer, the term of this patent is extended or adjusted under 35 U.S.C. 154(b) by 499 days.

(21) Appl. No.: 12/448,752

(22) PCT Filed: Jan. 17, 2008

(86) PCT No.: PCT/EP2008/050483
§ 371 (c)(1),
(2), (4) Date: Jul. 6, 2009

(87) PCT Pub. No.: WO2008/087175
PCT Pub. Date: Jul. 24, 2008

(65) Prior Publication Data
US 2010/0009200 A1    Jan. 14, 2010

(30) Foreign Application Priority Data
Jan. 17, 2007   (EP) .................... 07100635

(51) Int. Cl.
*B32B 27/40* (2006.01)
*B32B 37/12* (2006.01)
*C08L 75/06* (2006.01)
*B05D 3/00* (2006.01)

(52) U.S. Cl. ............... 428/424.6; 428/424.7; 428/424.8; 428/425.6; 156/315; 525/454; 427/207.1; 427/333

(58) Field of Classification Search .......... 428/424.7, 428/424.8, 425.6, 424.6; 156/315; 525/454; 427/207.1, 333
See application file for complete search history.

(56) References Cited

U.S. PATENT DOCUMENTS

| | | | |
|---|---|---|---|
| 4,643,794 A | 2/1987 | Saracsan et al. | |
| 5,115,086 A | 5/1992 | Hsieh | |
| 5,166,302 A | 11/1992 | Werner et al. | |
| 6,515,164 B1 | 2/2003 | Bolte et al. | |
| 2003/0084995 A1 | 5/2003 | Zhang | |
| 2004/0039113 A1 | 2/2004 | Miyata et al. | |
| 2005/0100742 A1 | 5/2005 | Zhang | |
| 2007/0037920 A1 * | 2/2007 | Kulling et al. | 524/500 |
| 2007/0055010 A1 * | 3/2007 | Ludewig et al. | 524/589 |

FOREIGN PATENT DOCUMENTS

| | | |
|---|---|---|
| DE | 197 00 014 A1 | 7/1998 |
| EP | 0 441 242 A2 | 8/1991 |
| EP | 0 511 566 A1 | 11/1992 |
| WO | WO 2006/042305 A1 | 4/2006 |

* cited by examiner

*Primary Examiner* — Thao T. Tran
(74) *Attorney, Agent, or Firm* — Oliff & Berridge, PLC

(57) ABSTRACT

Adhesion promoter compositions which include at least one binder having isocyanate groups. This specific binder is prepared from a mixture of a polyester resin A, at least one monomeric diphenylmethane diisocyanate, and at least one polyisocyanate B, where the proportion of monomeric diphenylmethane diisocyanate (MDI) is $\leq 2\%$ by weight of the overall composition. Such adhesion promoter compositions are particularly suitable for new generation automotive paint systems and are very desirable from an ecological and toxicological point of view owing to their low content of MDI.

27 Claims, No Drawings

BONDING AGENT COMPOSITION FOR POLYMER SUBSTRATES

TECHNICAL FIELD

The invention relates to the field of adhesion promoter compositions and the use thereof as undercoats for adhesives and sealants.

STATE OF THE ART

Adhesion promoter compositions have already been used for some time in order to improve the adhesion of adhesives and sealants on different substrates. Given the great variety and constant further development of such substrates, new and specific adhesion promoter compositions are also being required time and again.

A substrate of this kind on which adhesion is known to be difficult is paints. Particularly critical paints are the more recent generations of automotive paints in combination with one-component polyurethane adhesives or sealants.

There has therefore been a drive to find adhesion promoter compositions which exhibit good adhesion both on these more recent paint generations and on the paints and standard plastics used to date.

For instance, US 2003/0084995 A1, US 2005/0100742 A1 and U.S. Pat. No. 5,115,086 disclose adhesion promoter compositions comprising a polyester resin and polymeric diphenylmethane diisocyanate (also known as polymeric MDI or PMDI). However, owing to its preparation process, technical grade polymeric MDI inevitably contains a very high proportion of monomeric diphenylmethane diisocyanate (also referred to as monomeric MDI or MDI), which in turn is toxicologically and ecologically controversial.

One means of reducing the proportion of undesired monomeric MDI is disclosed in U.S. Pat. No. 4,643,794 and in an example in EP-A-0 441 242 and consists in using a smaller amount of polymeric MDI in the adhesion promoter composition, which also reduces the proportion of undesired monomeric MDI. Although this variant is capable of eliminating the toxicological and ecological concerns, it leads to poorer properties in adhesion and in mechanical properties especially for the new generation automotive paints.

SUMMARY OF THE INVENTION

It is therefore an object of the present invention to provide a novel adhesion promoter composition which is toxicologically and ecologically advantageous and does not suffer any losses with regard to the properties of the adhesion and mechanical properties.

It has now been found that, surprisingly, this object can be achieved by an adhesion promoter composition according to Claim 1. This involves partially replacing the polymeric MDI and thus inevitably also the monomeric MDI with inexpensive, toxicologically and ecologically less controversial polyisocyanates, which maintains or even improves the very good adhesion properties.

Furthermore, the invention relates to a coated substrate according to Claim 20, to a method for adhesive bonding or for sealing according to Claim 21, and to an article resulting therefrom according to Claim 26.

Further particularly preferred embodiments of the invention are the subject of the dependent claims.

WAYS OF PERFORMING THE INVENTION

The present invention relates to an adhesion promoter composition, which comprises at least one specific binder having isocyanate groups.

This specific binder is prepared from a mixture of a polyester resin A, at least one monomeric diphenylmethane diisocyanate, and at least one polyisocyanate B, where the proportion of monomeric MDI is $\leq 2\%$ by weight in the overall composition.

Substance names beginning with "poly", for example polyisocyanate, polyurethane, polyester, polyvinyl chloride, polymethyl methacrylate, polyol or polycarbonate, in the present document denote substances which formally contain two or more of the functional groups which occur in their name per molecule.

In the present document, the term "polymer" embraces firstly a collective of macromolecules which are chemically homogeneous but differ in relation to degree of polymerization, molar mass and chain length, which has been prepared by a polymerization reaction (addition polymerization, polyaddition, polycondensation). On the other hand, the term also embraces derivatives of such a collective of macromolecules from polymerization reactions, i.e. compounds which were obtained by reactions, for example additions or substitutions, of functional groups on given macromolecules, and which may be chemically homogeneous or chemically inhomogeneous. The term further also embraces so-called prepolymers, i.e. reactive oligomeric preadducts, whose functional groups are involved in the formation of macromolecules.

In the present document, "molecular weight" is always understood to mean the number-average molecular weight $M_n$.

The polyester resin A has at least one OH group. It is preferably amorphous and solid at room temperature. The melting point (melt flow) of the polyester resin A measured by the ring & ball method is typically more than 140° C., especially in the range between 150 and 160° C. In addition, the polyester resin A has a Shore D hardness at 25° C. of preferably between 70 and 85, especially between 75 and 85, preferably between 77 and 82.

Suitable polyester resins A are especially polyester resins, which are prepared from at least one dicarboxylic acid and at least one glycol. The polyester resin A preferably has a molecular weight of more than 12 000 g/mol, especially between 15 000 and 40 000 g/mol. Additionally preferably, the polyester resin A has an OH number between 1 and 10 mg KOH/g, especially between 2 and 9 mg KOH/g, preferably between 3 and 6 mg KOH/g.

The polyester resin A is preferably an aromatic polyester resin and typically has the following structure of the formula (I).

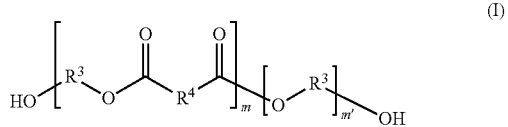

The $R^3$ and $R^4$ radicals here are each independently divalent organic radicals, and m and m' indicate the number of repeat units where m' is either 0 or 1.

Particularly preferred polyester resins A are those commercially available within the Vitel® 2000 product series from Bostik. In particular, these are Vitel® 2100, Vitel® 2180, Vitel® 2190, Vitel® 2000, Vitel® 2200, Vitel® 2300 and Vitel® 2700. Particular preference is given to Vitel® 2200, or Vitel® 2200B.

In addition, the adhesion promoter composition comprises monomeric diphenylmethane diisocyanate (MDI), which means that the amount of monomeric diphenylmethane diisocyanate (MDI) is >0% by weight, based on the weight of the overall adhesion promoter composition. More particularly, the proportion of monomeric MDI is ≦1% by weight, preferably ≦0.9% by weight, in the overall adhesion promoter composition. Additionally preferably, the proportion of monomeric MDI is ≧0.1% by weight, especially ≧0.2% by weight, preferably ≧0.5% by weight, based on the weight of the overall adhesion promoter composition.

The term "monomeric diphenylmethane diisocyanate" (MDI) is understood to mean all isomers of MDI, i.e. diphenylmethane 4,4'-diisocyanate, diphenylmethane 2,4'-diisocyanate and diphenylmethane 2,2'-diisocyanate and any desired mixtures of these isomers with one another. For example, such monomeric diphenylmethane diisocyanates are commercially available under the trade names Desmodur® 44 M and Desmodur® 2460 M from Bayer MaterialScience, Lupranate® M from BASF and Isonate® from Dow Plastics.

In a preferred embodiment of the invention, the monomeric MDI or a portion of the monomeric MDI is introduced into the adhesion promoter composition in the form of technical grade polymeric MDI. Technical grade polymeric MDI always also contains monomeric MDI as well as polymeric MDI, typically in an amount of 20-50% by weight. Polymeric MDI is a polymer and has a molecular weight of 250-500 g/mol, especially 350-450 g/mol, preferably 370-420 g/mol. In a preferred embodiment, the adhesion promoter composition thus additionally comprises polymeric MDI as well as monomeric MDI.

For example, such preferred polymeric diphenylmethane diisocyanates (PMDI) are commercially available under the trade names PAPI® 20, PAPI® 27, PAPI® 580N and Voranate® M580 from Dow Plastics, Desmodur® VL R 10 and Desmodur® VL R 20 from Bayer MaterialScience and Lupranate® M200 from BASF.

The proportion of the technical grade PMDI in the overall adhesion promoter composition is selected such that the total proportion of monomeric MDI does not exceed 2% by weight. The amount is preferably selected such that the total proportion of monomeric MDI is ≦1% by weight, preferably ≦0.9% by weight, in the overall adhesion promoter composition. Additionally preferably, the proportion of technical grade PMDI in the overall adhesion promoter composition is selected such that the total proportion of monomeric MDI is ≧0.1% by weight, especially ≧0.2% by weight, preferably ≧0.5% by weight, in the composition. The use of technical grade PMDI in the adhesion promoter composition can make the separate addition of monomeric MDI superfluous.

The proportion by weight of the monomeric diphenylmethane diisocyanate (MDI) in the total weight of all compounds having isocyanate groups in the adhesion promoter composition is preferably between 1 and 20% by weight, especially between 1 and 10% by weight, preferably between 2 and 8% by weight.

The polyisocyanate B is selected from the group consisting of biurets of polyisocyanates, isocyanurates of polyisocyanates and polyurethanes of the formula (II).

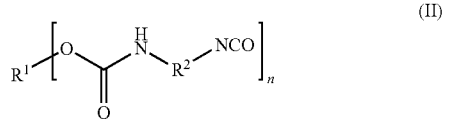

Suitable isocyanurates are isocyanurates of polyisocyanates, especially of diisocyanates, for example of 3-isocyanatomethyl-3,5,5-trimethylcyclohexyl isocyanate (isophorone diisocyanate or IPDI), bis(4-isocyanatocyclohexyl)methane ($H_{12}$MDI), 1,6-hexamethylene diisocyanate (HDI), 2,4- and 2,6-tolylene diisocyanate (TDI), 4,4'-, 2,4'- and 2,2'-diphenylmethane diisocyanate (MDI), 1,3-bis(isocyanatomethyl)benzene (xylylene diisocyanate or XDI), 1,3-bis(isocyanatomethyl)cyclohexane ($H_{12}$XDI), 2,2,4- and 2,4,4-trimethyl-1,6-hexamethylene diisocyanate (TMDI) and any desired mixtures of the particular isomers.

Especially suitable are isocyanurates of aliphatic and cycloaliphatic polyisocyanates, preferably an isocyanurate of 1,6-hexamethylene diisocyanate (HDI).

Especially preferred are isocyanurates which are commercially available, for example, under the trade names Desmodur® N 3300, Desmodur® N 3600, Desmodur® Z 4470 and Desmodur® IL from Bayer MaterialScience, Tolonate® HDT from Rhodia, Basonat® HI 100 from BASF, Luxate® HT 2000 and Luxate® IT 1070 from Lyondell and Vestanat® T 1890 from Degussa.

Suitable biurets are biurets of polyisocyanates, especially of diisocyanates. The corresponding diisocyanates have already been described for the isocyanurates. Especially suitable are biurets of aromatic polyisocyanates, for example of tolylene diisocyanate (TDI). Preference is given to a biuret of 2,4-tolylene diisocyanate.

In addition, it is also possible to use biurets and/or isocyanurates formed from different polyisocyanates. One example of such an isocyanurate is a mixed TDI/HDI isocyanurate, as obtainable from Bayer MaterialScience under the trade name Desmodur® HL.

Suitable polyisocyanates B are especially polyurethanes of the formula (II).

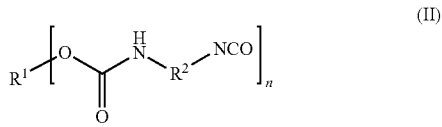

$R^1$ here is an n-valent organic radical, $R^2$ is an aliphatic, cycloaliphatic or aromatic organic radical, and n is from 2 to 8, especially 2, 3, or 4.

Suitable polyurethanes of the formula (II) are especially those in which $R^1$ is an aliphatic organic radical having 2 to 15 carbon atoms, preferably a radical selected from the group consisting of

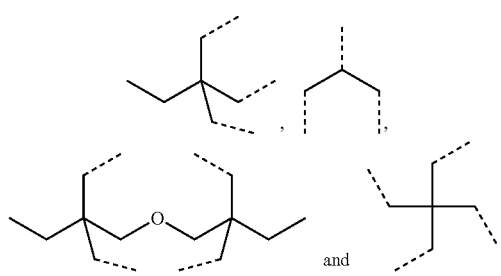

Additionally preferred are polyurethanes of the formula (II), in which $R^2$ is an aliphatic, cycloaliphatic or aromatic organic radical, especially a radical selected from the group consisting of

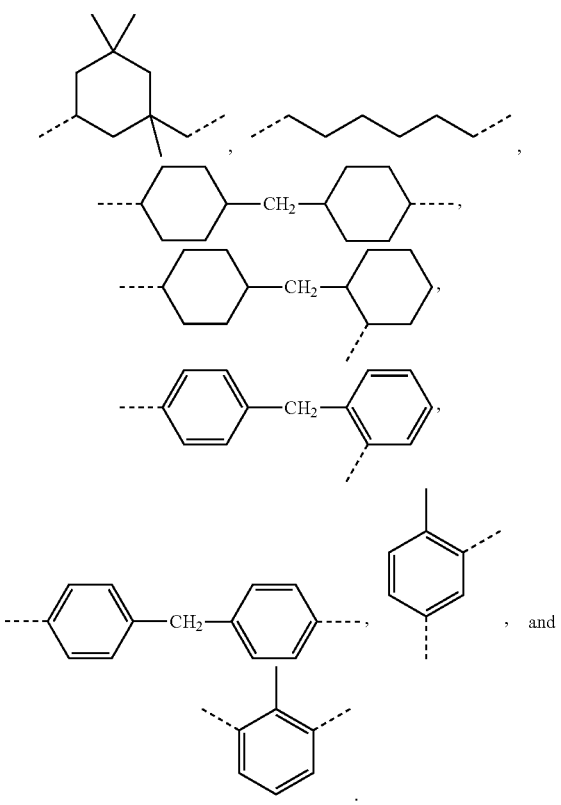

Most preferably suitable are polyurethanes of the formula (II), in which $R^1$ is a radical of the formula (III) and $R^2$ is a radical of the formula (IVa) or (IVb).

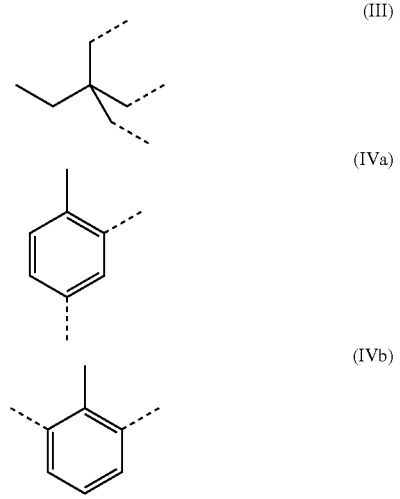

The dotted lines in the formulae of this document each represent the bond between the particular substituent and the corresponding molecular radical.

For example, such preferred polyurethanes of the formula (II) are commercially available under the trade name Desmodur® L 75 from Bayer MaterialScience.

The polyurethanes of the formula (II) are especially obtainable from a polyol of the formula $R^1(OH)_n$ and a polyisocyanate of the formula OCN—$R^2$—NCO. A stoichiometric excess of the NCO groups over the OH groups is present, especially in a ratio of NCO/OH of $\geq 2$. This achieves the effect that predominantly simple adducts form and the proportion of higher molecular polymers is at a minimum.

For all polyurethanes of the formula (II), it is advantageous when they have an isocyanate equivalent weight of 150-300 g/eq, especially of 200-250 g/eq. The isocyanate equivalent weight of the polyurethane of the formula (II) is understood here to mean the molecular weight $M_n$ of the polyurethane of the formula (II) divided by the number of isocyanate groups per molecule.

It may additionally be advantageous when mixtures of compounds having isocyanate groups, especially of polyisocyanates B, are used. Typically, these are mixtures of isocyanurates and/or biurets and/or polyurethanes of the formula (II). Preference is given to mixtures of isocyanurates and polyurethanes of the formula (II).

Especially preferably, the adhesion promoter composition comprises mixtures of polyisocyanates B with polymeric diphenylmethane diisocyanate (PMDI). Most preferred are mixtures of isocyanurates, polyurethanes of the formula (II) and polymeric MDI.

The proportion of polyester resin A is preferably 1-30% by weight, especially 2-20% by weight, preferably 5-12% by weight, of the overall adhesion promoter composition.

In particular, the ratio of polyester resin A and all compounds having isocyanate groups, especially the polyisocyanates B, should be selected such that the stoichiometric ratio of the isocyanate groups (NCO groups) to that of the OH groups is in the range between 30:1 and 100:1, especially between 50:1 and 100:1. The stoichiometric ratio of the NCO groups to that of the OH groups is preferably between 60:1 and 90:1, most preferably between 70:1 and 80:1.

In one embodiment, the adhesion promoter composition additionally comprises tris(p-isocyanatophenyl) thiophosphate. This is obtainable, for example, under the trade name Desmodur® RFE from Bayer MaterialScience.

The addition of tris(p-isocyanatophenyl) thiophosphate to the adhesion promoter composition leads typically to a desired improvement in the adhesion properties with a simultaneous means of reducing the proportion of polymeric MDI and accordingly also the proportion of monomeric MDI. However, it is not preferred in every case owing to the relatively high costs of tris(p-isocyanatophenyl) thiophosphate.

Further preferably the adhesion promoter composition additionally comprises at least one solvent. The solvents used are especially ethers, ketones, esters or hydrocarbons, preferably diethyl ether, tetrahydrofuran, methyl ethyl ketone, acetone, hexane, heptane, xylene, toluene or acetates, especially methyl acetate, ethyl acetate or butyl acetate.

The adhesion promoter composition may additionally further comprise at least one silane of the formula $R^5$—Si$(R^6)_a$$(OR^7)_{3-a}$. The $R^5$ radical here is an alkyl radical having at least one functional group, especially an epoxy, (meth)acrylate ester, amine or vinyl group. The $R^6$ radical is an alkyl radical having 1 to 6 carbon atoms and the $R^7$ radical is an alkyl radical having 1 to 4 carbon atoms, especially methyl or ethyl. The index a is a value of 0, 1 or 2, especially a value of 0.

The proportion of silane is preferably 0.1-5% by weight in the overall adhesion promoter composition.

The adhesion promoter composition typically further comprises at least one carbon black, especially industrially produced carbon black. The proportion of the carbon black in the overall adhesion promoter composition is preferably 1-20% by weight, especially 2-15% by weight, preferably 3-10% by weight.

The adhesion promoter composition may comprise further constituents, for example catalysts, desiccants, thixotropic agents, dispersants, wetting agents, corrosion inhibitors, further adhesion promoters, UV and heat stabilizers, pigments, dyes and UV indicators.

Catalysts which accelerate the reaction of the isocyanate groups with water are, for example, organotin compounds such as dibutyltin dilaurate, dibutyltin dichloride, dibutyltin diacetylacetonate, organobismuth compounds or bismuth complexes, or compounds containing amine groups, for example, 2,2'-dimorpholinodiethyl ether or 1,4-diazabicyclo[2.2.2]octane, or other catalysts customary in polyurethane chemistry for the reaction of the isocyanate groups.

The adhesion promoter composition according to the above description preferably has a proportion of binder of 5-50% by weight, especially 10-30% by weight, preferably 15-25% by weight, in the overall composition.

The binder is prepared preferably by initially charging the polyester resin A, typically dissolved in a solvent, and then adding the compounds containing isocyanate groups. When a plurality of compounds containing isocyanate groups is used, i.e. for example, an isocyanurate of a polyisocyanate and a polyurethane of the formula (II), they can be added to the dissolved polyester resin A already as a mixture or individually in succession.

An alternative preparation process is the initial charging of the polyisocyanate B, or of the compounds containing isocyanate groups, and subsequent addition of the polyester resin A.

The adhesion promoter composition described is particularly suitable as an undercoat, preferably as an undercoat for adhesives and/or sealants. Use of such an undercoat improves adhesion.

The adhesion promoter composition can be applied by means of a cloth, felt, roller, spray, sponge, brush, dip-coater or the like, and can be applied either manually or by means of robots.

The present invention also further comprises a method for adhesive bonding or for sealing. Especially the three variants of this method which follow are preferred.

The first variant comprises the steps of
i) applying an adhesion promoter composition as described above to a substrate S1 to be adhesive bonded or sealed;
ii) applying an adhesive or sealant to the flashed-off adhesion promoter composition present on the substrate S1;
iii) contacting the adhesive or sealant with a second substrate S2.

The second variant comprises the steps of
i') applying an adhesion promoter composition as described above to a substrate S1 to be adhesive bonded or sealed;
ii') applying an adhesive or sealant to the surface of a second substrate S2;
iii') contacting the adhesive or sealant with the flashed-off adhesion promoter composition present on the substrate S1.

The third variant comprises the steps of
i") applying an adhesion promoter composition as described above to a substrate S1 to be adhesive bonded or sealed;
ii") flashing off the adhesion promoter composition;
iii") applying an adhesive or sealant between the surfaces of the substrate S1 and S2.

In all three variants, the second substrate S2 consists of the same material as, or of a different material from, the substrate S1.

Typically, step iii), iii') or iii") is followed by a step iv) for curing the adhesive or sealant.

The present invention further embraces a substrate S1 and/or S2 coated with an adhesion promoter composition, as has already been described above, which is especially a plastic, a glass, a glass ceramic, a metal, a painted metal, a metal alloy or a painted metal alloy.

When the substrates S1 and/or S2 comprise a plastic, it is a polymer especially selected from the group consisting of polyvinyl chloride (PVC), acrylonitrile-butadiene-styrene copolymer (ABS), polymethyl methacrylate (PMMA) and polycarbonate (PC).

When the substrates S1 and/or S2 comprise a metal, the metal is especially a coated metal or a coated metal alloy, preferably a metal or a metal alloy which has been painted. Preferred metals and metal alloys are especially those as used in automobile construction. These are typically aluminium, magnesium and alloys thereof, and also steel, especially zinc-plated steel.

Particularly preferred paints are paints of modes of transport, especially automotive paints, automotive topcoats, and cathodic electro coats. The most preferred paints are new generation automotive paints, especially multi-bake paints, which are known to cause adhesion problems for adhesives and/or sealants, especially in the case of one-component moisture-curing polyurethane adhesives or sealants.

When the substrates S1 and/or S2 are glass or glass ceramic, these are understood to mean glass or glass ceramics as typically occur in vehicle windscreens or in the edge region of vehicle windscreens. The construction and production of such glass ceramics are known to the person skilled in the art.

Adhesives and sealants are very similar in terms of their structure and their properties. In order to fulfil their function optimally, both require good adhesion to the substrate. The requirements on the adhesion, or on the forces which have to be transmitted between substrate and adhesive, are, however, significantly higher for the adhesives than for the sealants. Consequently, the adhesion promoter composition is used especially in adhesives.

The adhesive used may in principle be any one-component or multicomponent adhesive. Preference is given to using a moisture-curing adhesive, especially an adhesive which is cured by means of air humidity. These are firstly adhesives based on polymers terminated with silane groups, as known to the person skilled in the art under the name "MS polymers", or secondly based on polyurethanes terminated with silane groups, as known to the person skilled in the art under the name "SPUR" (Silane Terminated Polyurethanes). The advantageous improvements in adhesion have, however, been found especially in the case of polyurethane adhesives or sealants, especially in the case of polyurethane adhesives, which contain polyurethane polymers having isocyanate groups. Such polyurethane adhesives are commercially widely available, especially under the Sikaflex® or SikaTack® name from Sika Schweiz AG.

Suitable adhesives based on isocyanate-terminated polymers are likewise understood to mean two-component polyurethane adhesives whose first component comprises an amine or a polyol and whose second component a polymer having isocyanate groups or a polyisocyanate. Examples of such two-component polyurethane adhesives which cure at room temperature are those from the SikaForce® product line, as are commercially available from Sika Schweiz AG.

Suitable adhesives based on isocyanate-terminated polymers are additionally reactive polyurethane hot melt adhesives, which comprise a thermoplastic polymer and an isocyanate-terminated polymer or a thermoplastic isocyanate-terminated polymer. Such reactive polyurethane hot melt adhesives are melted and firstly solidify in the course of cooling and secondly crosslink through a reaction with air humidity. For example, such reactive polyurethane hot melt adhesives are commercially available under the SikaMelt® name from Sika Schweiz AG.

The present application likewise further embraces adhesive bonded or sealed articles which are obtained by a method as described above.

These articles are preferably a built structure, especially a built structure in construction or civil engineering, or industrial goods or consumer goods, especially a window, a domestic appliance, or a mode of transport, especially a water or land vehicle, preferably an automobile, a bus, a truck, a train or a ship. Such articles are preferably also installable components, especially also modular components, which are used as modules on the production line and are especially glued on or in. These prefabricated installable components are used especially in the construction of modes of transport. For example, such installable components are drivers' cabins of trucks or of locomotives, or sunroofs of automobiles. These articles are preferably windowpanes of modes of transport, especially windowpanes of automobiles and trucks.

EXAMPLES

Preparation of the Adhesion Promoter Compositions

According to the amounts in Table 1, the polyester resin A was initially charged in the solvent or in a portion thereof. The polyisocyanate B and/or the Voranate® M580 (polymeric MDI with monomer content 34% by weight), dissolved in the rest of the solvent if need be, was then added under a nitrogen atmosphere with constant stirring, and stirred at 30° C. over one hour. Subsequently, the mixture was heated to 40° C. and stirred until the NCO content was constant. Subsequently, carbon black was added and the mixture admixed with glass beads in a tightly sealable sheet metal can, sealed and mixed intimately with the aid of a Red Devil shaking apparatus over one hour.

After the mixing, the glass beads were removed and the adhesion promoter composition was filled into a tightly closing aluminium bottle.

minute flash-off time, the adhesives were applied as a round bead with a cartridge press and a nozzle to the paint or polymer surface which have been coated with the adhesion promoter composition. The adhesive temperatures on application were 45° C. for "SF-250 DM-2", 80° C. for "STUF", 23° C. for "SF-555" and 60° C. for "SF-655 WM"

Subsequently, the adhesive was cured at 23° C. and 50% relative air humidity over 7 days (climate-controlled room temperature storage: "CCS"), and one third of the bead was tested by means of the adhesion test described below. Thereafter the sample was placed into water at 23° C. over a further 7 days (water storage: "WS"). Subsequently, the adhesion was tested by the bead test for a further third of the bead. Thereafter, the painted substrates were exposed over a further 7 days to a water condensation climate of 100% relative air humidity and 40° C. ("WCS"), or in the case of the polymeric substrates, to hot and humid conditions of 100% relative air humidity and 70° C. ("HHS") and then the adhesion of the last third of the bead was determined.

Paints

Paints with the following topcoats were used:
HDCT 4041 from PPG ("HDCT4041");
RK 8046 from DuPont ("RK8046");
RK4126 from DuPont ("RK4126").

These paints are new generation automotive paints. These paints have inadequate adhesion performance for one-component polyurethane adhesives without pre-treatment by means of adhesion promoter compositions.

Polymers

The following polymers were used
PVC from Rocholl, Germany;
ABS from Rocholl, Germany;
PMMA from Rocholl, Germany;
PC from Rocholl, Germany.

Adhesives

The following adhesives which are commercially available from Sika Schweiz AG were used:
Sikaflex®-250 DM-2 "SF-250 DM-2"; high-modulus, one-component polyurethane adhesive;
SikaTack®-Ultrafast "STUF"; low-modulus one-component polyurethane adhesive;

TABLE 1

Adhesion promoter compositions (all data in % by weight, with the exception of [1)][NCO]:[OH] in mol/mol).

|  | Ref-1 | Ref-2 | Ref-3 | Ref-4 | Ref-5 | 1 | 2 | 3 |
|---|---|---|---|---|---|---|---|---|
| Vitel ® 2200B | 8.2 | 11.2 | 8.7 | 8.7 | 8.2 | 10.0 | 9.4 | 10.1 |
| Desmodur ® N3300 |  | 13.1 | 5.1 | 3.4 |  | 5.8 | 3.6 | 3.9 |
| Desmodur ® L 75 |  |  | 8.3 |  |  |  | 5.9 |  |
| Desmodur ® RFE |  |  |  | 20.4 |  |  |  | 11.8 |
| Voranate ® M580 | 8.0 |  |  |  | 2.7 | 4.1 | 2.6 | 2.8 |
| Solvent | 77.8 | 66.7 | 68.9 | 58.6 | 83.1 | 71.0 | 69.5 | 62.4 |
| Carbon black | 6.0 | 9.0 | 9.0 | 9.0 | 6.0 | 9.0 | 9.0 | 9.0 |
| Total | 100.0 | 100.0 | 100.0 | 100.0 | 100.0 | 100.0 | 100.0 | 100.0 |
| Compound containing NCO groups | 8.0 | 13.1 | 13.4 | 23.7 | 2.7 | 10.0 | 12.1 | 18.5 |
| Monomeric MDI | 2.72 |  |  |  | 0.92 | 1.41 | 0.88 | 0.95 |
| [NCO]:[OH][1)] | 88:1 | 75:1 | 75:1 | 75:1 | 30:1 | 75:1 | 75:1 | 75:1 |

Test Method

Application and Curing

The adhesion promoter compositions were each applied as a coat by means of a brush to various substrates. After a 30

Sikaflex®-655 WM "SF-655 WM"; one-component "warm melt" polyurethane adhesive;

Sikaflex®-555 "SF-555"; one-component polyurethane adhesive terminated with silane groups.

Adhesion Test ("Bead Test")

The adhesion of the adhesive was tested by means of the 'bead test'. This involves incising at the end of the bead just above the adhesive face. The incised end of the bead is held with rounded-end tweezers and pulled from the substrate. This is done by carefully rolling up the bead on to the tip of the tweezers, and placing a cut at right angles to the direction of bead pulling down to the bare substrate. The bead pulling rate should be selected such that a cut has to be made about every 3 seconds. The test distance must be at least 8 cm. After the bead has been pulled off, adhesive remaining on the substrate is assessed (cohesion fracture). The adhesion properties are assessed by estimating the cohesive component of the adhesive phase:

1=>95% cohesion fracture

2=75-95% cohesion fracture

3=25-75% cohesion fracture

4=<25% cohesion fracture

5=0% cohesion fracture (purely adhesive fracture)

"P" in the evaluation denotes detachment of the primer from the substrate, "ED" means edge detachment and "L" means paint fracture.

Test results with cohesion fracture values of less than 75% are considered unsatisfactory.

TABLE 2

Adhesion results of different adhesives on different polymer substrates after different storage.

| Substrate | APC[2)] | SF-250 DM-2 | | | STUF | | | SF-655 WM | | | SF-555 | | |
|---|---|---|---|---|---|---|---|---|---|---|---|---|---|
| | | RT | WS | HHS | RT | WS | HHS | RT | WS | HHS | RT | WS | HHS |
| PVC | Ref-1 | 1 | 1 | 1 | 1 | 1 | 1 | 1 | 1 | 1 | 1 | 1 | 1 |
| | Ref-2 | 1 | 1 | 1 | 1 | 1 | 1 | 1 | 1 | 1 | 1 | 1 | 1 |
| | Ref-3 | 1 | 1 | 2ED | 1 | 1 | 1 | 1 | 1 | 1 | 1 | 1 | 1 |
| | Ref-4 | 1 | 1 | 2 | 1 | 1 | 1 | 1 | 1 | 1 | 1 | 1 | 5 |
| | 1 | 1 | 1 | 2ED | 1 | 1 | 1 | 1 | 1 | 1 | 1 | 1 | 1 |
| | 2 | 1 | 1 | 1 | 1 | 1 | 1 | 1 | 1 | 1 | 1 | 1 | 1 |
| | 3 | 1 | 1 | 1 | 1 | 1 | 1 | 1 | 1 | 1 | 1 | 1 | 1 |
| ABS | Ref-1 | 2P | 1 | 1 | 1 | 1 | 1 | 2P | 1 | 1 | 2 | 1 | 1 |
| | Ref-2 | 1 | 1 | 1 | 2 | 1 | 1 | 1 | 1 | 3 | 1 | 5P | 1 |
| | Ref-3 | 1 | 1 | 1 | 1 | 1 | 1 | 2 | 2 | 1 | 1 | 1 | 1 |
| | Ref-4 | 1 | 1 | 1 | 1 | 1 | 1 | 1 | 1 | 2 | 1 | 1 | 1 |
| | 1 | 1 | 1 | 1 | 3 | 3 | 2 | 1 | 2 | 2 | 1 | 1 | 1 |
| | 2 | 1 | 1 | 1 | 1 | 1 | 1 | 1 | 1 | 1 | 1 | 1 | 1 |
| | 3 | 1 | 1 | 1 | 1 | 1 | 1 | 1 | 1 | 2 | 1 | 1 | 3 |
| PMMA | Ref-1 | 3P | 5P | 5P | 2P | 5P | 5P | 1 | 5P | 5P | 2P | 2P | 2P |
| | Ref-2 | 5P | 5P | 5P | 5P | 5P | 5P | 5P | 5P | 5P | 1 | 3P | 5P |
| | Ref-3 | 1 | 1 | 1 | 1 | 1 | 1 | 1 | 1 | 1 | 1 | 1 | 1 |
| | Ref-4 | 1 | 1 | 1 | 1 | 1 | 1 | 1 | 1 | 1 | 1 | 1 | 1 |
| | 1 | 2P | 1 | 5P | 3P | 2P | 5P | 1 | 1 | 5P | 1 | 1 | 4P |
| | 2 | 1 | 1 | 1 | 1 | 1 | 1 | 1 | 1 | 1 | 1 | 1 | 1 |
| | 3 | 1 | 1 | 1 | 1 | 1 | 1 | 1 | 1 | 1 | 1 | 1 | 1 |
| PC | Ref-1 | 3P | 3P | 5P | 1 | 1 | 3P | 2 | 1 | 3P | 2P | 1 | 1 |
| | Ref-2 | 1 | 1 | 1 | 1 | 1 | 1 | 1 | 1 | 1 | 1 | 1 | 1 |
| | Ref-3 | 1 | 1 | 2ED | 1 | 1 | 1 | 1 | 1 | 1 | 1 | 1 | 1 |
| | Ref-4 | 1 | 1 | 1 | 1 | 1 | 1 | 1 | 1 | 1 | 1 | 1 | 1 |
| | 1 | 1 | 1 | 1 | 1 | 1 | 1 | 1 | 1 | 1 | 1 | 1 | 1 |
| | 2 | 1 | 1 | 1 | 1 | 1 | 1 | 1 | 1 | 1 | 1 | 1 | 1 |
| | 3 | 1 | 1 | 1 | 1 | 1 | 1 | 1 | 1 | 1 | 1 | 1 | 1 |

[2)]APC = Adhesion promoter composition.

TABLE 3

Adhesion results of different adhesives on different painted substrates after different storage.

| Substrate | APC[2)] | SF-250 DM-2 | | | STUF | | | SF-655 WM | | | SF-555 | | |
|---|---|---|---|---|---|---|---|---|---|---|---|---|---|
| | | RT | WS | WCS | RT | WS | WCS | RT | WS | WCS | RT | WS | WCS |
| HDCT 4041 | Ref-1 | 3P | 2P | 3P | 1 | 2P | 3P | 2P | 3P | 2P | 3P | 3P | 4P |
| | Ref-2 | 1 | 1 | 1 | 3P | 3P | 3P | 2P | 4P | 3P | 5 | 5P | 5P |
| | Ref-3 | 3P | 2P | 3P | 3P | 3P | 3P | 3P | 3P | 4P | 2P | 3P | 5P |
| | Ref-4 | 2P | 1 | 3P | 2P | 1 | 3P | 2P | 2P | 2P | 2P | 2P | 2ED |
| | Ref-5 | 4P | 5P | 5P | 3P | 3P | 5P | 4P | 5P | 5P | 5P | 5P | 5P |
| | 1 | 2P | 1P | 3P | 1P | 1P | 3P | 1P | 1P | 3P | 3P | 2P | 3P |
| | 2 | 3P | 1P | 3P | 2P | 2P | 2P | 3P | 2P | 2P | 2P | 2P | 5P |
| | 3 | 2P | 1 | 2P | 1P | 1P | 2P | 2P | 2P | 3P | 2P | 1 | 1P |
| RK 8046 | Ref-1 | 2P | 2P | 2L | 1 | 1 | 2L | 1 | 2L | 2L | 1 | 1 | 2L |
| | Ref-2 | 1 | 1 | 2L | 1 | 1 | 2L | 2P | 1 | 2L | 4P | 5P | 5P |
| | Ref-3 | 1 | 2L | 4P | 3P | 3L | 4P | 2P | 2P | 4P | 2P | 5P | 5P |
| | Ref-4 | 1 | 1 | 2L | 1 | 1 | 2L | 1 | 1 | 2L | 2P | 1 | 2L |
| | 1 | 1 | 1L | 1L | 1 | 1 | 2L | 1 | 1 | 2L | 2P | 2P | 2L |

TABLE 3-continued

Adhesion results of different adhesives on different painted substrates after different storage.

| Substrate | APC[2)] | SF-250 DM-2 | | | STUF | | | SF-655 WM | | | SF-555 | | |
|---|---|---|---|---|---|---|---|---|---|---|---|---|---|
| | | RT | WS | WCS | RT | WS | WCS | RT | WS | WCS | RT | WS | WCS |
| | 2 | 2P | 1L | 2L | 1P | 1 | 2L | 1P | 1 | 2L | 2P | 1P | 4P |
| | 3 | 1 | 1 | 2L | 1 | 1 | 2L | 1 | 1 | 2L | 2P | 1 | 2L |
| RK 4126 | Ref-1 | 3P | 2P | 1 | 2P | 2P | 1 | 2P | 2P | 1 | 2P | 1 | 1 |
| | Ref-2 | 1 | 1 | 1 | 4P | 2P | 1 | 4P | 4P | 2P | 5P | 5P | 5P |
| | Ref-3 | 1 | 1 | 1 | 1 | 1 | 1 | 1 | 1 | 1 | 2P | 2P | 5P |
| | Ref-4 | 1 | 1 | 1 | 1 | 1 | 1 | 1 | 1 | 1 | 1 | 1 | 1 |
| | 1 | 1 | 1 | 1 | 1 | 1 | 1 | 1 | 1 | 1 | 3P | 1P | 2P |
| | 2 | 1 | 1 | 1 | 1 | 1 | 1 | 1 | 1 | 1 | 1P | 2P | 5P |
| | 3 | 1 | 1 | 1 | 1 | 1 | 1 | 1 | 1 | 1 | 1 | 1 | 1 |

[2)]APC = Adhesion promoter composition.

Results

The adhesion results are compiled in Tables 2 and 3. They show that the inventive examples have exceptionally good adhesion on plastics and painted substrates. Especially Examples 2 and 3, which have a content of monomeric MDI of less than 1% by weight, exhibit particularly good adhesion in spite of the low content of monomeric MDI.

The invention claimed is:

1. An adhesion promoter composition comprising at least one binder which has isocyanate groups and is prepared from a mixture of
   a) at least one polyester resin A, which has at least one OH group;
   b) at least one monomeric diphenylmethane diisocyanate (MDI); and
   c) at least one polyisocyanate B, which is selected from the group consisting of biurets of polyisocyanates; isocyanurates of polyisocyanates; and polyurethanes of the formula (II);

$$\left[ R^1 {-} O {-} \overset{O}{\underset{\phantom{O}}{C}} {-} \overset{H}{\underset{\phantom{H}}{N}} {-} R^2 {-} NCO \right]_n \quad (II)$$

where $R^1$ is an n-valent organic radical;
$R^2$ is an aliphatic, cycloaliphatic, or aromatic organic radical; and
n is from 2 to 8,
wherein the content of the monomeric diphenylmethane diisocyanate (MDI) in the adhesion promoter composition is $\leq 2\%$ by weight, based on the weight of the overall adhesion promoter composition.

2. The adhesion promoter composition according to claim 1, wherein the adhesion promoter composition further comprises polymeric diphenylmethane diisocyanate (PMDI).

3. The adhesion promoter composition according to claim 1, wherein the polyester resin A is prepared from at least one dicarboxylic acid and at least one glycol.

4. The adhesion promoter composition according to claim 1, wherein the polyester resin A has an OH number between 1 and 10 mg KOH/g.

5. The adhesion promoter composition according to claim 1, wherein the content of the monomeric diphenylmethane diisocyanate (MDI) is $\leq 1\%$ by weight based on the weight of the overall adhesion promoter composition.

6. The adhesion promoter composition according to claim 1, wherein the isocyanurate is an aliphatic isocyanurate.

7. The adhesion promoter composition according to claim 1, wherein $R^1$ is an aliphatic organic radical having 2 to 15 carbon atoms.

8. The adhesion promoter composition according to claim 1, wherein $R^2$ is an aliphatic, cycloaliphatic, or aromatic organic radical.

9. The adhesion promoter composition according to claim 1, wherein
$R^1$ is an organic radical of the formula (III)

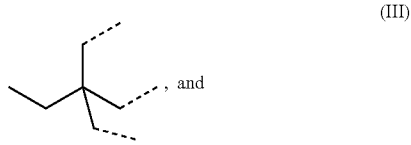

$R^2$ is an organic radical of the formula (IVa) or (IVb)

10. The adhesion promoter composition according to claim 1, wherein a proportion by weight of the monomeric diphenylmethane diisocyanate (MDI) in the total weight of all compounds having isocyanate groups in the adhesion promoter composition is between 1 and 20%.

11. The adhesion promoter composition according to claim 1, wherein a proportion of polyester resin A is 1-30% by weight of the overall adhesion promoter composition.

12. The adhesion promoter composition according to claim 1, wherein the polyester resin A and all compounds having isocyanate groups are used in a ratio such that a stoichiometric ratio of NCO groups to a stoichiometric ratio of OH groups is between 30:1 and 100:1.

13. The adhesion promoter composition according to claim 1, wherein the polyurethanes represented by formula (II) have an isocyanate equivalent weight of 150-300 g/eq.

14. The adhesion promoter composition according to claim 1, wherein the adhesion promoter composition additionally comprises tris(p-isocyanatophenyl)thiophosphate.

15. The adhesion promoter composition according to claim 1, wherein the adhesion promoter composition further comprises at least one solvent.

16. The adhesion promoter composition according to claim 1, wherein the adhesion promoter composition further comprises at least one silane of the formula $R^5$—$Si(R^6)_a(OR^7)_{3-a}$, where $R^5$ is an alkyl with at least one functional group;
$R^6$ is an alkyl radical having 1 to 6 carbon atoms;
$R^7$ is an alkyl radical having 1 to 4 carbon atoms; and
a is a value of 0, 1, or 2.

17. The adhesion promoter composition according to claim 1, wherein the adhesion promoter composition additionally comprises at least one carbon black.

18. The adhesion promoter composition according to claim 1, wherein a proportion of the binder is 5-50% by weight of the overall adhesion promoter composition.

19. A method of forming an undercoat for adhesives and/or sealants comprising providing an adhesion promoter composition according to claim 1.

20. A substrate coated with an adhesion promoter composition according to claim 1, wherein the substrate is a member selected from the group consisting of plastic, glass, glass ceramic, metal, painted metal, metal alloy, and painted metal alloy.

21. A method for adhesive bonding or for sealing, comprising the steps of:
   i) applying an adhesion promoter composition according to claim 1 to a substrate S1 to be adhesive bonded or sealed;
   ii) applying an adhesive or a sealant to a flashed-off adhesion promoter composition present on the substrate S1; and
   iii) contacting the adhesive or the sealant with a second substrate S2;
or
   i') applying an adhesion promoter composition according to claim 1 to a substrate S1 to be adhesive bonded or sealed;
   ii') applying an adhesive or a sealant to a surface of a second substrate S2; and
   iii') contacting the adhesive or the sealant with a flashed-off adhesion promoter composition present on the substrate S1;
or
   i'') applying an adhesion promoter composition according to claim 1 to a substrate S1 to be adhesive bonded or sealed;
   ii'') flashing off the adhesion promoter composition; and
   iii'') applying an adhesive or a sealant between surfaces of the substrate S1 and the substrate S2
   the second substrate S2 consisting of the same material as, or a different material from, the substrate S1.

22. The method according to claim 21, wherein the substrate S1 and/or the substrate S2 is a polymer selected from the group consisting of polyvinyl chloride (PVC), acrylonitrile-butadiene-styrene copolymer (ABS), polymethyl methacrylate (PMMA) and polycarbonate (PC).

23. The method according to claim 21, wherein the substrate S1 is a coated metal or a coated metal alloy.

24. The method according to claim 21, wherein the substrate S2 is a glass or glass ceramic.

25. The method according to claim 21, further comprising a step iv) for curing the adhesive or sealant, wherein step iv) follows step iii), iii') or iii'').

26. An article which has been adhesive bonded or sealed by the method according to claim 21.

27. The article according to claim 26, wherein the article is a built structure, an industrial good, a consumer good, a mode of transport, or an installable component of a mode of transport.

* * * * *